United States Patent
McIntyre et al.

(10) Patent No.: US 7,360,703 B2
(45) Date of Patent: Apr. 22, 2008

(54) LASER SCANNING SYSTEM FOR OBJECT MONITORING

(75) Inventors: Timothy James McIntyre, Knoxville, TN (US); Lonnie Curtis Maxey, Powell, TN (US); Peter John Chiaro, Jr., Clinton, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 497 days.

(21) Appl. No.: 10/947,951

(22) Filed: Sep. 23, 2004

(65) Prior Publication Data

US 2006/0060651 A1   Mar. 23, 2006

(51) Int. Cl.
*G06K 7/10* (2006.01)

(52) U.S. Cl. ............... 235/454; 356/614; 356/616; 356/622

(58) Field of Classification Search ............ 235/454; 356/614, 616, 622, 615, 617, 618, 619, 620, 356/621, 623, 624
See application file for complete search history.

(56) References Cited

U.S. PATENT DOCUMENTS

| | | | |
|---|---|---|---|
| 3,802,780 A * | 4/1974 | Helm et al. ............... | 356/141.1 |
| 4,143,263 A | 3/1979 | Eichweber | |
| 4,334,775 A | 6/1982 | Breecher et al. | |
| 4,788,441 A | 11/1988 | Laskowski | |
| 4,983,021 A | 1/1991 | Fergason | |
| 5,148,016 A * | 9/1992 | Murakami et al. ........ | 250/221 |
| 5,305,091 A * | 4/1994 | Gelbart et al. ........... | 356/620 |
| 5,327,216 A * | 7/1994 | Berni ....................... | 356/486 |
| 5,973,788 A * | 10/1999 | Pettersen et al. ......... | 356/614 |
| 6,097,491 A * | 8/2000 | Hartrumpf ................. | 356/622 |
| 6,493,123 B1 | 12/2002 | Mansell et al. | |
| 6,618,132 B1 * | 9/2003 | Vann ........................ | 356/141.1 |

FOREIGN PATENT DOCUMENTS

WO    WO 03/017193    2/2003

\* cited by examiner

*Primary Examiner*—Daniel A Hess
(74) *Attorney, Agent, or Firm*—Edna Gergel; Joseph Marasco; James Spicer

(57) ABSTRACT

A laser scanner is located in a fixed position to have line-of-sight access to key features of monitored objects. The scanner rapidly scans pre-programmed points corresponding to the positions of retroreflecting targets affixed to the key features of the objects. The scanner is capable of making highly detailed scans of any portion of the field of view, permitting the exact location and identity of targets to be confirmed. The security of an object is verified by determining that the cooperative target is still present and that its position has not changed. The retroreflecting targets also modulate the reflected light for purposes of returning additional information back to the location of the scanner.

26 Claims, 17 Drawing Sheets

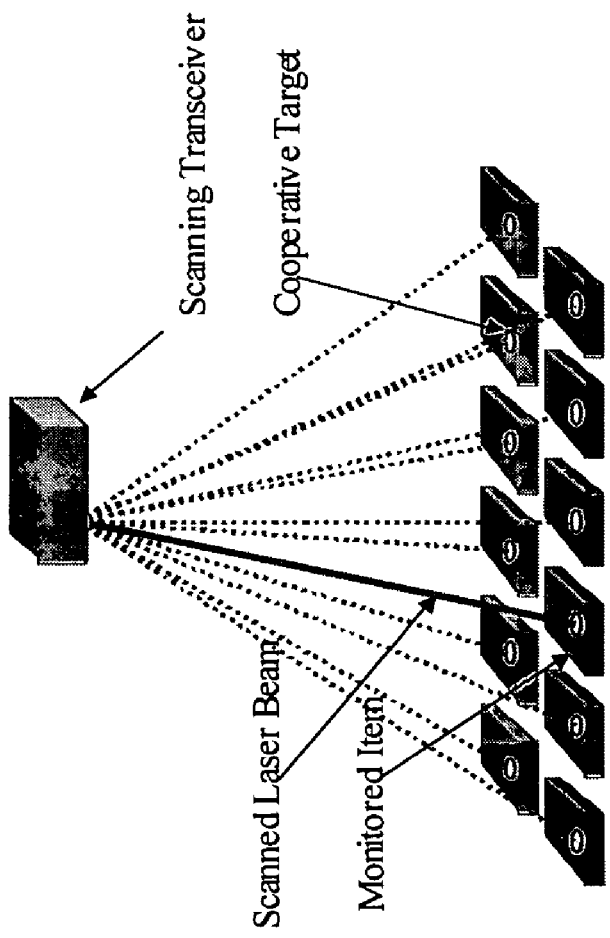
FIG. 17--Prior Art

LASER SCANNING SYSTEM FOR OBJECT MONITORING

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

BACKGROUND OF THE INVENTION

1. Field of the Invention

The invention is related to optical systems for monitoring the motion of objects. In particular, increased information bandwidth is achieved in a laser scanning transceiver system through the use of a noncommon collection path for the return light from retroreflectors located on the monitored objects.

2. Description of Prior Art

Wireless monitoring systems, whether based on optical or radio frequency (RF) technologies, are used in many applications where it is desired to monitor the movement of large structures, vehicles or groups of stationary objects. The purpose is to measure the position and/or disturbance to that position of tags located on objects, and to do so with a scanning laser beam that is capable of precisely locating the position and/or change in position of the tags.

Wireless sensor technologies, data platforms, and active identification tags that are based on RF transmission links have become commodity items that are familiar building blocks of monitoring system architectures. These RF communications building blocks offer the ability to provide continuous multiplexed data transfer, on-board data storage with periodic transfers, data transfer on demand (via RF interrogation), and/or periodic state of health verification as may be required to accommodate the needs of various monitoring scenarios. The RF transmissions can be authenticated and encrypted through standardized methods to verify the validity and conceal the content of the transmitted information.

Despite their tremendous versatility, there are applications where the use of RF data transmission systems is prohibited or impractical. The objections arise from the fundamental nature of RF transmissions. Radio waves enable communications by inducing electrical currents in surrounding antennas. The transmitted radio waves must be strong enough to induce a useful current in the antenna of the intended receiver at the desired working distance. Due to the omnidirectional nature of RF transmission, not only is the antenna of the intended receiver excited, but any other conductor that is in the area may be excited as well. At a minimum, this implies that care must be taken with the assignment of transmission frequencies to ensure sufficient channel availability and avoid interaction with other wireless systems. It also suggests the possibility for third-party interception of the data transmissions, which may represent an unacceptable security risk or political irritant. In addition, there are some environments, particularly where explosive atmospheres or high explosives are present, in which RF transmissions may pose a prohibitive physical safety hazard.

All or most of the features of RF transmission links can be implemented with optical links, provided that line-of-sight is maintained between the laser scanner and the object or objects tagged with retroreflectors. The crosstalk, third-party interception, and physical safety limitations of RF transmission links are greatly reduced or totally eliminated when highly directional optical links are used. Optical communication links can replace the RF transmitter and receiver antennas with highly directional optical devices (lasers and retroreflectors) and optical detectors (photodiodes). All of the functional capabilities associated with wireless RF components are still present, and conventional authentication and encryption methods can still be used to encode the transmitted data.

Optical monitoring systems have some unique advantages over RF systems. A typical laser scanning transceiver system is illustrated in FIG. 17. In FIG. 17, a laser scanner has line-of-sight access to the monitored objects or structure. In operation, the scanner can rapidly scan pre-programmed points corresponding to the positions of cooperative targets (retroreflectors) affixed to objects of interest. The security of an object is verified by determining that the retroreflector is still present, and that its position has not changed.

Laser scanning transceivers are usually connected to a computer which maintains selected pertinent data regarding the retroreflectors. The angular position of each retroreflector relative to the scanner is stored, and represents the position where the transceiver will point the scanning beam to look for a reflected return signal.

In its simplest form, if the scanner receives a return signal from a retroreflector, and if it is of similar intensity to a stored intensity level associated with that object's retroreflector, the indication is that the object is still present. This is sufficient information when rapidly scanning an entire array of objects to determine that each is present. The laser scanner output is aligned to the receiver input during initial setup and beyond that, the system operation is functionally equivalent to that of the RF systems, with multiple optical wavelengths taking the place of multiple RF frequencies.

A feature of laser scanning systems is that remote third party interception of the optical transmissions can become virtually impossible because interception of the transmissions require some physical access to the line-of-sight optical beam between the transmitter and receiver. This line-of-sight property can also reduce the need for complex encryption schemes because the scanning process would quickly detect tampering with the optical link.

In some applications such as monitoring stored high value objects, better target (retroreflector) identity is needed, and improved integrity verification of the scans is also desired. This requires that more detailed information be stored for each target. When a target is added to the list of monitored targets and installed in a location for scanning, a detailed scan of the target is performed. The resulting high-resolution intensity data map is stored for comparison with later detailed scans to uniquely identify the target. These data are also used for verification of target integrity because small translational or rotational displacements of the retroreflector are readily identifiable.

As object security becomes ever more important, even better means for ensuring the integrity of scanning laser systems is needed. We realized some possible ways of doing this might be by altering the scanning laser beam by the use of amplitude or frequency modulation, polarization, change of beam shape or other such means. These kinds of beam alterations are not known in laser scanning transceiver systems, but are realized by our invention. Laser scanning transceiver systems are usually configured such that the return beam from the retroreflector element lies on the same axis as the incident beam from the laser. Any change imposed on the incident laser beam such as modulation or polarization would be returned by the retroreflector, and would mask the modulation or polarization induced changes in the return beam that one wants to detect. Some examples of the prior art follow.

REFERENCES

K. Eichweber, U.S. Pat. No. 4,143,263, Issued Mar. 6, 1979.

J. D. Breecher et al, U.S. Pat. No. 4,334,775, Issued Jun. 15, 1982.

E. L. Laskowski, U.S. Pat. No. 4,788,441, Issued Nov. 29, 1988.

J. L. Fergason, U.S. Pat. No. 4,983,021, Issued Jan. 8, 1991.

D. N. Mansell et al, U.S. Pat. No. 6,493,123, Issued Dec. 10, 2002.

N. P. Eisenberg et al, PCT publication WO 03/017193 A1, Published Feb. 27, 2003.

BRIEF SUMMARY OF THE INVENTION

It is a first object of the invention to provide an improved optical system for monitoring a plurality of stored objects, upon which are placed passive, semi-active or active tags.

It is another object of the invention to provide a laser scanning system with substantially increased information bandwidth.

In a laser scanning system, it is an object to provide a means for authenticating information received from retroreflectors associated with monitored objects.

In a laser scanning system, it is another object to provide means for improving the reliability of information received from retroreflectors associated with monitored objects.

In a laser scanning system, it is another object to provide means for improving the reliability of the scanner/retroreflector link itself.

In a laser scanning system, it is another object to provide tags that include an external sensor input that causes the tag to produce a modulation (encoding) of the returned signal.

In a laser scanning system, it is another object to provide the ability to both amplitude and frequency modulate signal transfer.

In a laser scanning system, it is another object to scan fixed targets in a point-to-point manner that enables very high resolution data to be obtained rapidly.

In a laser scanning system, it is another object to provide a data collection methodology that, while producing high resolution data, creates manageable data sets.

In a laser scanning system, it is another object to dynamically vary the data resolution.

In a laser scanning system, it is another object to provide target signal levels that can be used to indicate a change in target position or condition.

In a laser scanning system, it is another object to provide inherent target reflectance characteristics can be used to generate unique target signatures.

In a laser scanning system, it is another object to utilize multiple laser wavelengths that provide additional information, implement encryption methodologies or activate varying retroreflector behavior.

In a preferred embodiment, the invention is an apparatus for determining the presence and displacement of a retroreflector attached to an object. It comprises a laser; a means for angularly steering a light beam from the laser; a wide angle lens positioned within the cone of returned light from the retroreflector, the lens offset from the axis of the steered laser beam; a detector for receiving the returned light collected by the wide angle lens and converting the light into an electrical signal; and a controller for coordinating the operation of the light beam steering means and the detector, the controller also capable of relating the electrical signal generated by the detector to the position and characteristics of the angularly steered light beam. In another preferred embodiment, the controller includes a computer for processing the electrical signal from the detector.

BRIEF DESCRIPTION OF THE DRAWINGS

FIG. 17 is an illustration of a laser scanning transceiver system known in the prior art.

DETAILED DESCRIPTION OF THE INVENTION

Figure 1:
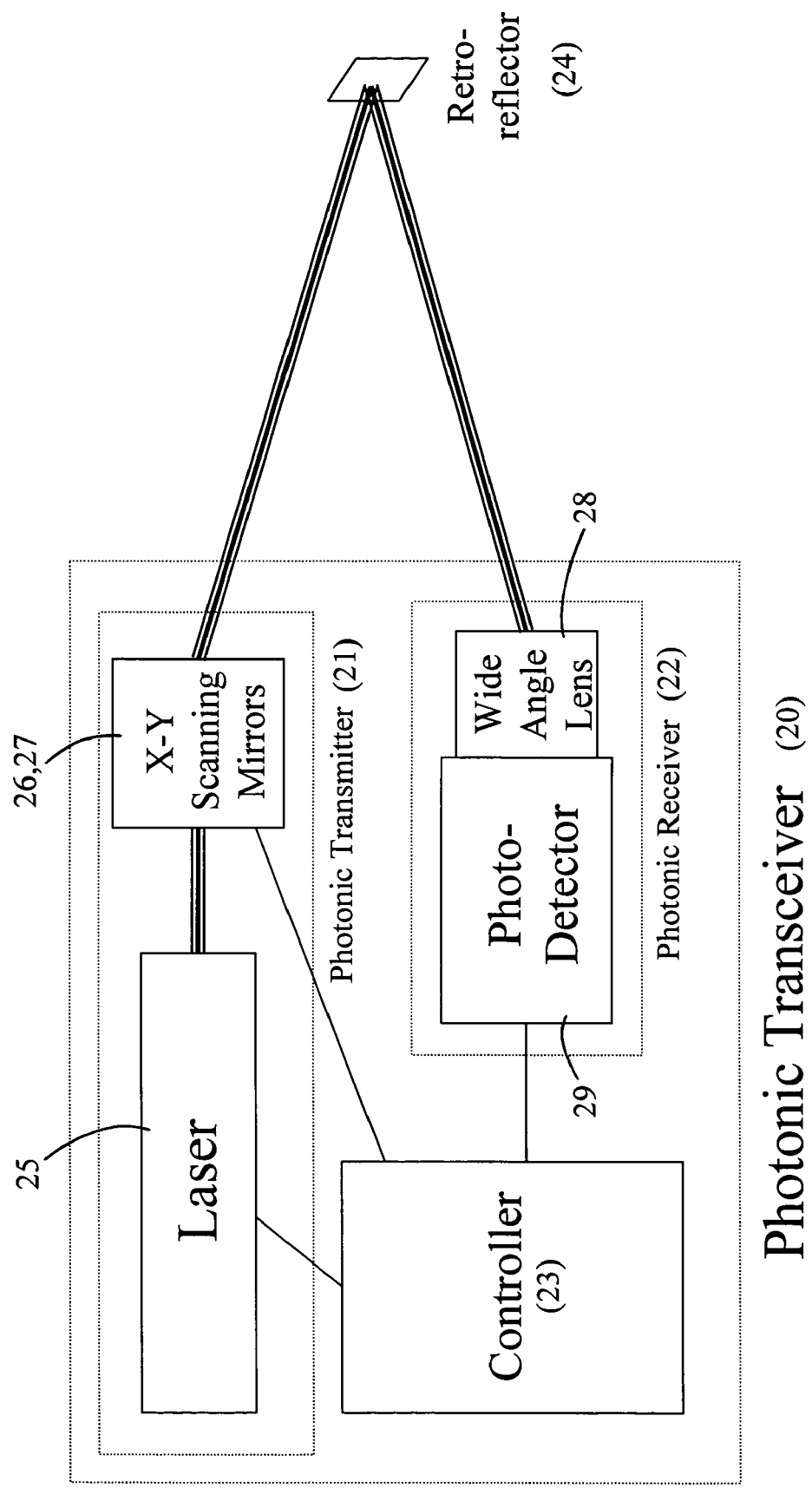
FIG. 1 is a block diagram of a laser scanning transceiver system in accordance with one embodiment of the invention.
Figure 2:
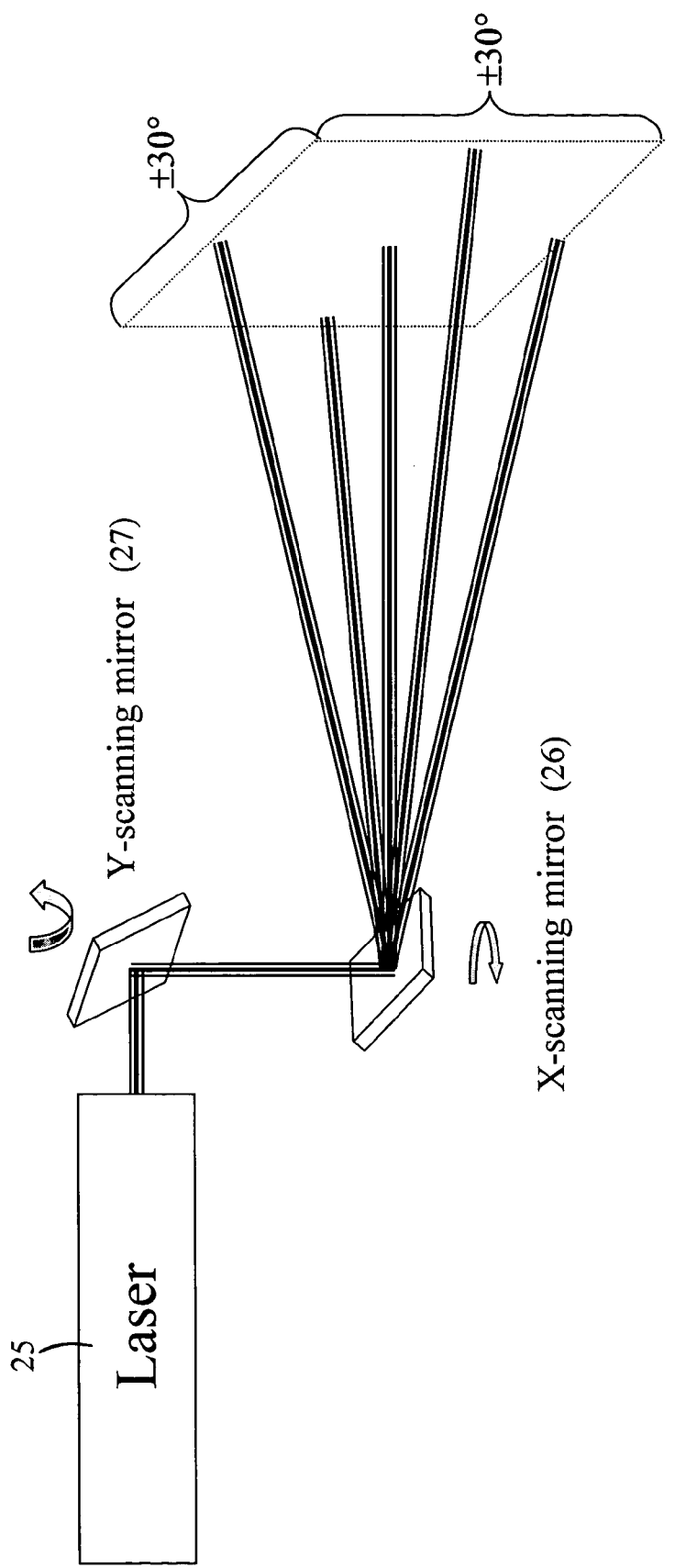
FIG. 2 is a block diagram of the photonic transmitter portion of the system of FIG. 1
Figure 3:
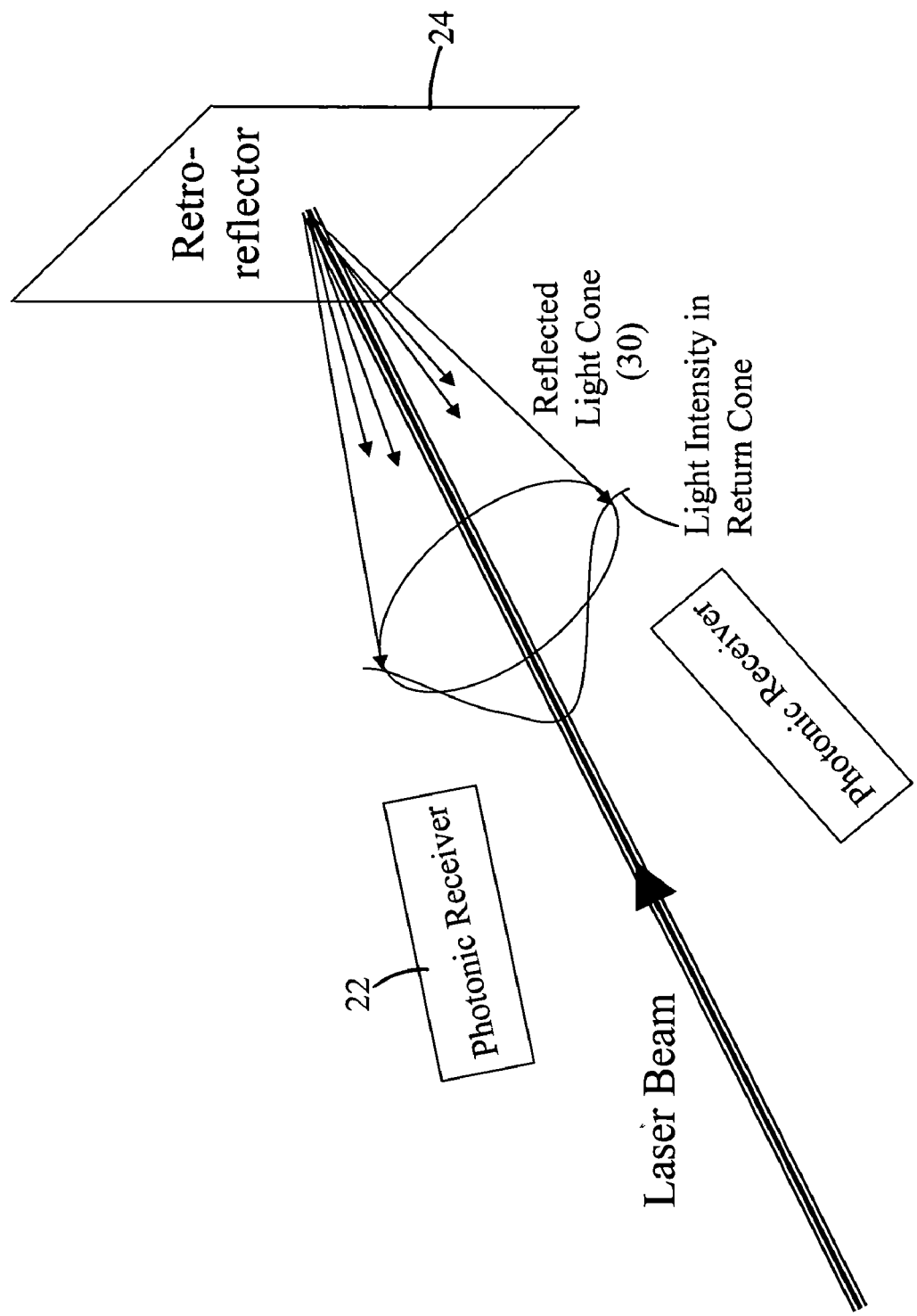
FIG. 3 illustrates the diffuse reflected cone of light returning to the photonic receiver portion of the system of FIG. 1.

In FIG. 1, the laser scanning system of our invention includes at least one photonic transceiver 20 that comprises a photonic transmitter 21, a photonic receiver 22, and a controller 23. The photonic transmitter 21 directs laser light to one or more retroreflecting targets 24. The photonic transmitter 21 shown in FIG. 2 includes a means for steering the laser beam to a multiplicity of targets in the scanned field. The steering range is generally limited to ±30° from normal, in both the horizontal and vertical directions, and is accomplished via galvanometer controlled rotating mirrors 26, 27. The device used for rotating the mirrors 26, 27 may be a Cambridge Technology 2-D scanning mirror device model 6350, for example. Once the laser beam has been directed to a retroreflective target, the target returns a diffuse cone of light 30 as shown in FIG. 3. Depending upon the characteristics of the retroreflective target 24, the distribution of returned light energy may vary as a function of location, characteristics of the impinging laser beam, or as a function of the viewing angle. Thus, the location of the photonic receiver 22 must be within the returned cone of light energy 30 to detect the presence and displacement of a retroreflected target 24. The information carried within the returned signal depends upon the location of view, how viewing is conducted (e.g. utilizing filtering or demodulation techniques, etc.) and how the retroreflective tag 24 is illuminated. The intensity of the light in the return cone 30 is greatest on the return laser beam axis, and diminishes at distances away from the axis. This is shown by the curve 30 superimposed on FIG. 3. The controller 23 in FIG. 1 coordinates the operation of each component 21, 22, enabling them to operate as a system. The controller is also used to determine and store positional information that is based on the angular position of the scanning mirrors 26, 27 and the characteristics of the retroreflected light.

Retroreflection is the process of sending light or other radiation back in the direction from which it arises regardless of the angle of incidence. This is unlike a mirror which retroreflects only if the incident beam is perpendicular to the mirror. This effect can be accomplished in two ways. One is with a set of three perpendicular mirrors (a corner reflector), and the other is with a transparent sphere of material with refractive index 2. The retroreflective tags employed with the photonic transceiver include two types of materials; those with arrays of micro-spheres and those with arrays of miniature corner reflectors. Typical examples of such materials include reflecting tapes from Reflexite Corporation and various 3M Corporation tape and laminate products. The nature of these micro-structured retroreflectors is such that much of the energy is reflected in a narrow cone of light, but some of the light energy is scattered or diffused into a broader cone of light energy. Thus, off-axis viewing can produce a valuable measurement of returned energy and may in some cases be the result of a photonic transmitter and/or retroreflector with tailored properties.

In FIG. 1, the photonic receiver 22 includes a wide angle lens 28 to maximize light energy collection, and a light detector element or photodetector 29 to convert the collected light energy into an electrical signal for further analysis. The photodetector 29 (usually a photocell) is not placed in its usual position on the common axis with the incident laser light. Instead, the photodetector 29 in our system is offset (placed off-axis) from the incident light path, but still within the cone of return light from the retroreflector 24.

Because we use a photodetector 29 and wide angle lens 28 to detect the return light from the retroreflector on a non-common path from the incident light beam path, we can freely make a number of modifications to the incident light beam. We thus provide a much greater information bandwidth for each laser scanning transceiver and retroreflector in the system. Some examples of alteration of the scanning laser beam made possible by the invention include amplitude or frequency modulation, polarization, and change of beam diameter of focal length to name a few. Noncommon path operation also eliminates the need for beam splitting, as in common path arrangements, which results in 50% of the beam energy being split off and discarded. Furthermore, common path arrangements would not be able to utilize a beam steering approach as we have and realize the ability to rapidly scan many retroreflecting targets over a wide region.

Figure 4:
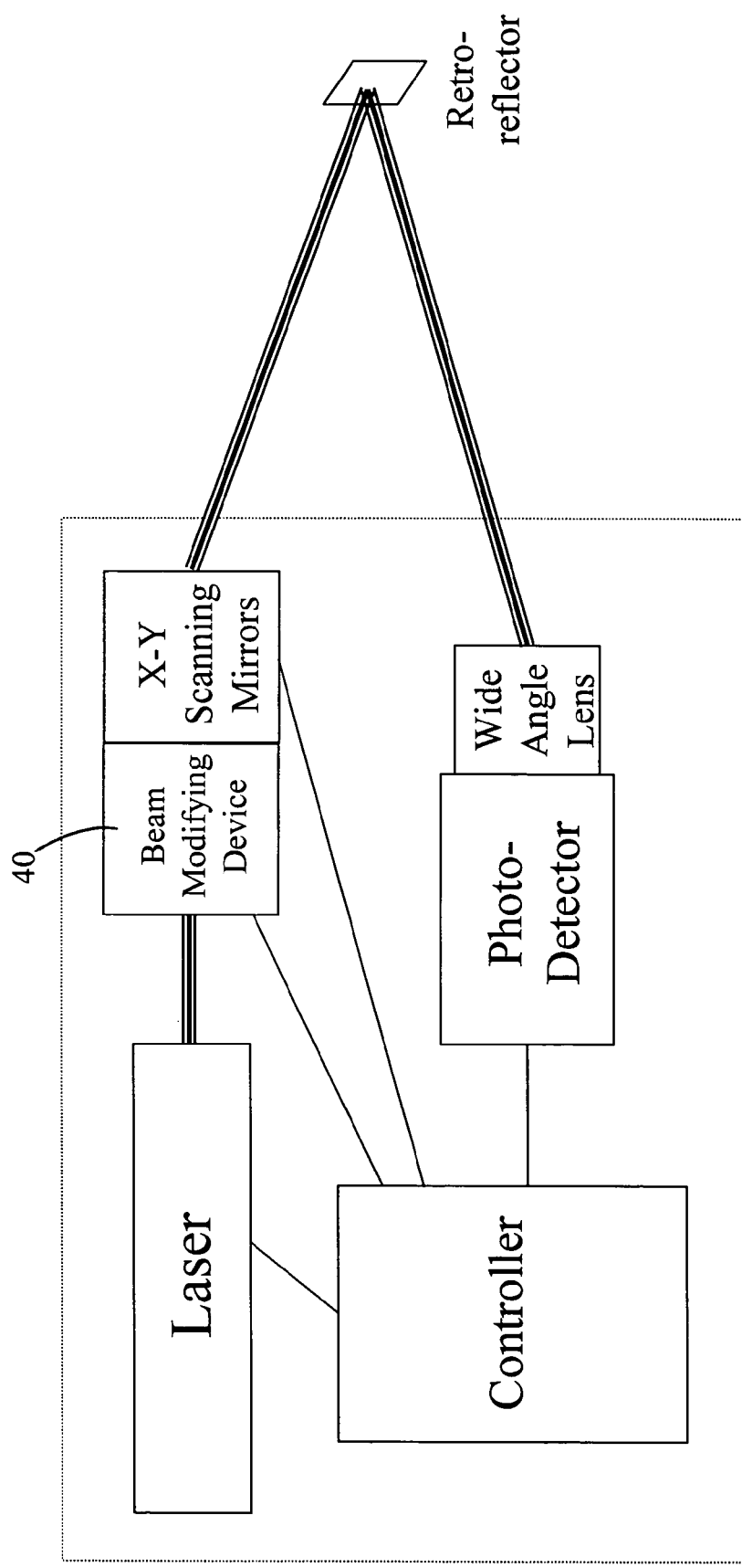
FIG. 4 illustrates a beam modifying device incorporated into the system of FIG. 1.

The photonic transceiver 20 can be augmented to include a laser beam modifying device 40 as shown in FIG. 4. The beam modifying device may include various means for changing the characteristics of the laser beam before it is directed to the retroreflecting targets by the scanning mirror device. The beam modifying means 40 is utilized to enhance the information bandwidth of the system.

Figure 5:
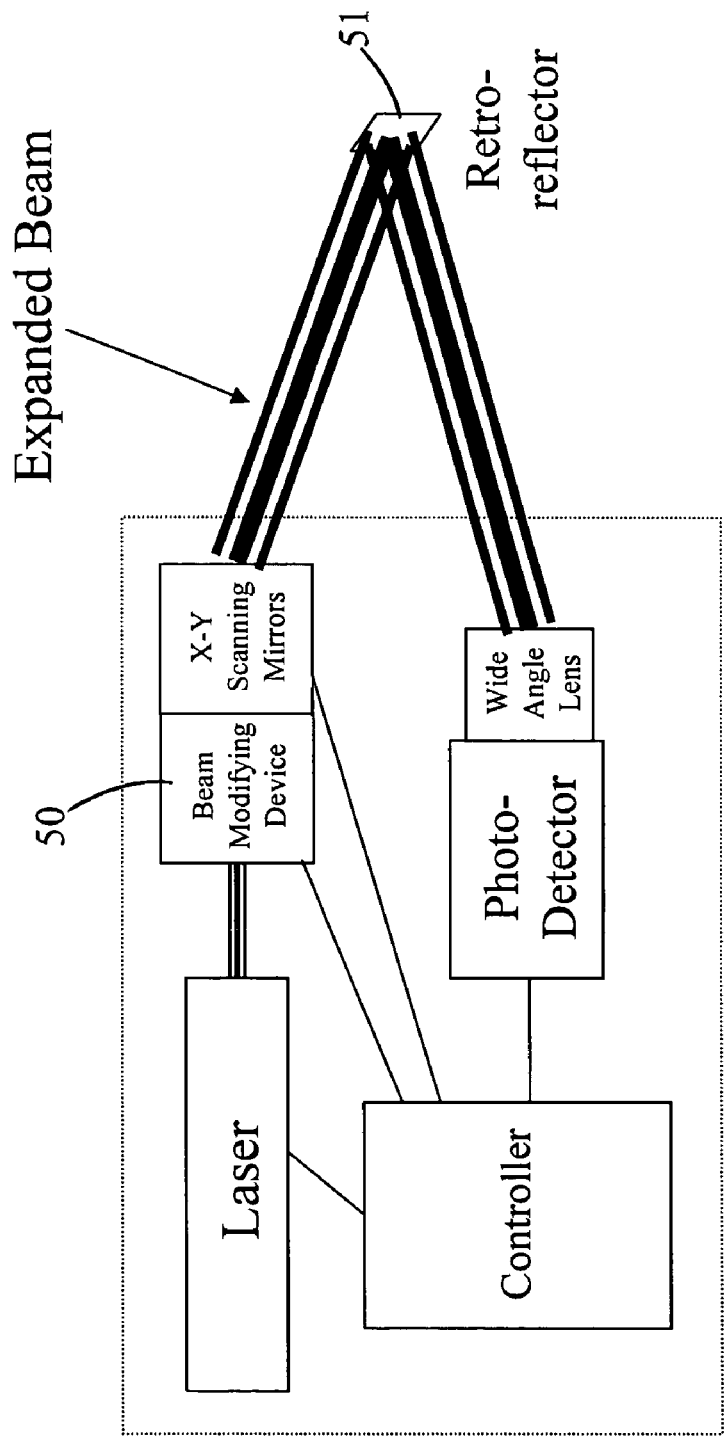
FIG. 5 illustrates the operation of the system of FIG. 4.

The photonic transceiver 20 may include a beam modifying device 50 that expands or contracts the diameter of a collimated beam of laser light as illustrated in FIG. 5. A small diameter laser beam may be utilized to illuminate a subregion of a retroreflective target 51. The target may be scanned with this small diameter beam in a raster fashion to reveal indicia, scanned in certain patterns to determine a centroid, or scanned to illuminate some embedded signature. Each of the above methods involves a conveyance of additional information that would not be gained via a full tag illumination, thus increasing the information bandwidth of the system.

FIG. 5 also illustrates that during a scan that employs a large diameter laser beam, the full extent of a retroreflective tag may be illuminated. In this case, only reflective link integrity and coarse tag identification can be ascertained.

Figure 6:
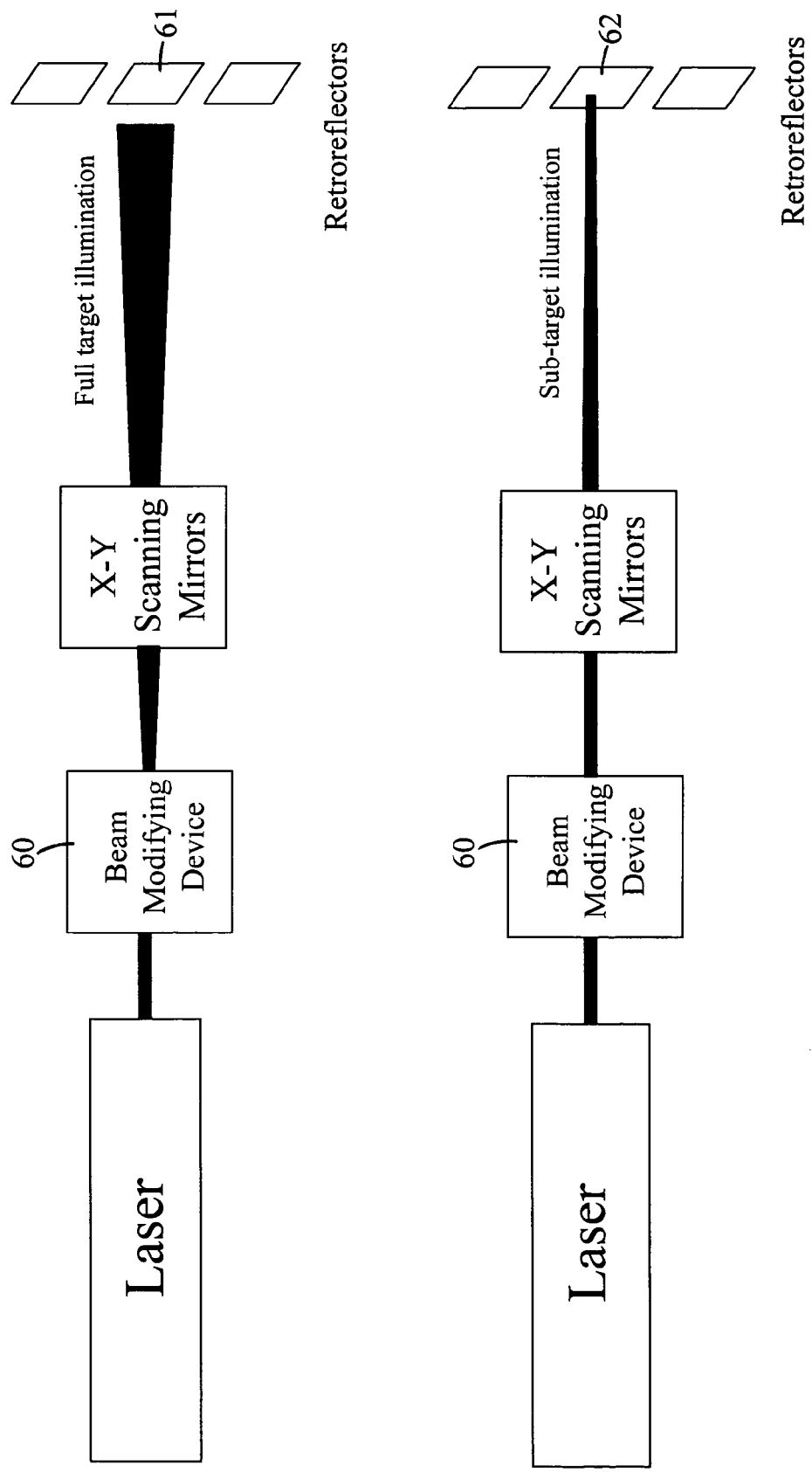
FIG. 6 illustrates a beam modifying device capable of varying the divergence of the laser beam of the system of FIG. 1.

FIG. 6 illustrates a beam modifying device 60 that varies the divergence of the steered laser beam. The beam modifying device 60 can be a variable focal length telescope. By changing the divergence of the laser beam, one can illuminate sub-target retroreflector regions, full targets, or possibly more than one target at a time. FIG. 6 illustrates a laser beam with negative divergence that would be utilized to fully illuminate a target 61. Alternatively, a converging beam could be used to illuminate only a small subregion of a target 62. Diverging beams may be useful to determine the existence of multiple tags simultaneously, or verify that tags remain spatially positioned relative to one another over time. Very narrowly focused beams can be used to interrogate fine micro-structural details embedded within tags or to determine more precisely the location of critical features such as edges, a centroid, or key indicia, thus increasing the information bandwidth of the system.

Figure 7:
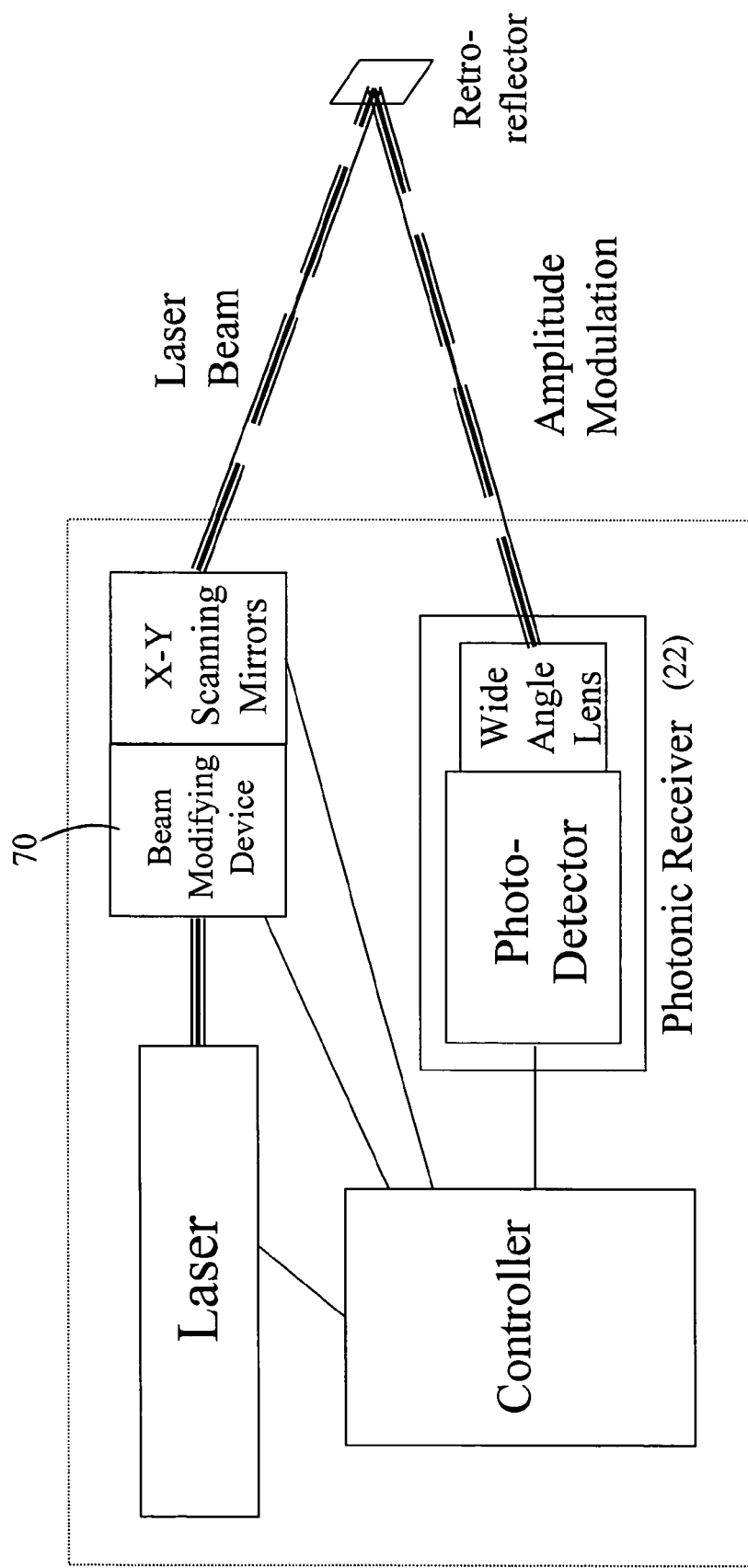
FIG. 7 illustrates a beam modifying device capable of amplitude modulating the laser beam of the system of FIG. 1.

In FIG. 7, the photonic transceiver may employ a beam modifying device 70 that causes an amplitude modulation in the steered laser beam. The figure illustrates a periodic amplitude modulation of the laser beam. Rather than an on/off modulation of the laser such as that caused by periodically varying the input control signal to the laser itself, the beam modifying device can continuously vary the intensity of the laser and thus the retroreflected signal arriving at the photonic receiver 22. This continuously variable beam intensity can be used to verify link integrity or be used in various encryption schemes, thus increasing the information bandwidth of the system.

The methodology by which amplitude may be modulated in a continuous manner would include continuously varying neutral density filters, digital light processing devices such as the Texas Instruments DLP, micro-mirror array, or a variable beam splitter.

Figure 8:
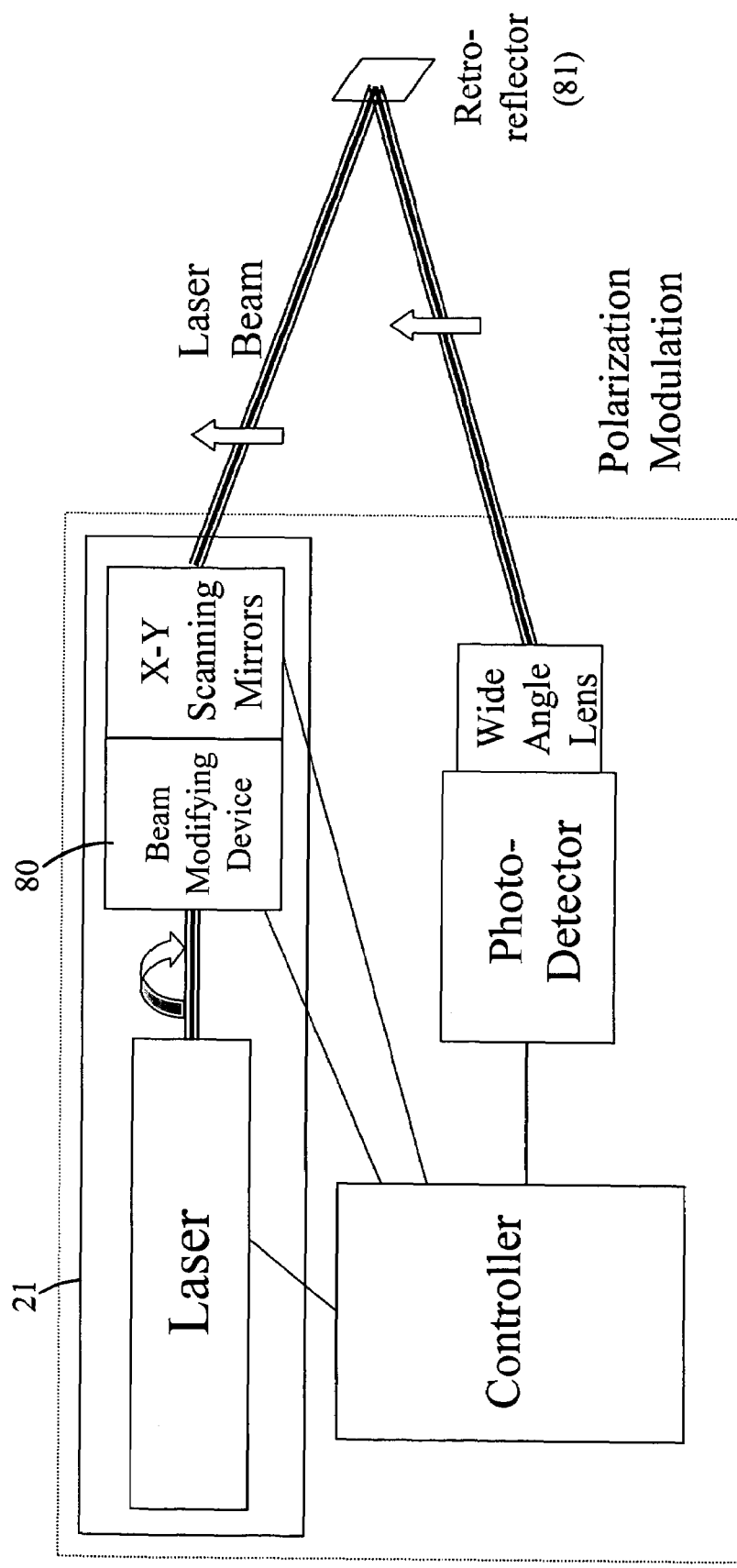
FIG. 8 illustrates a beam modifying device capable of varying the polarization of the laser beam of the system of FIG. 1.

In FIG. 8, the photonic transmitter 21 may include a beam modifying device 80 capable of varying the polarization of the steered laser beam. A polarization filter, retarder, photo-elastic modulators or other such devices that impart a change in the polarization state or content of a laser beam could be used to tailor the illumination of the retroreflecting target 81. Retroreflected polarization dependent indicia could then be interrogated via beam steering, or an apparent reduction in reflected intensity may result from illumination with a beam of a particular polarization.

Polarization dependent reflectivity is observed in the native spatial properties of micro-structured retroreflectors and can be used to create uniquely identify signatures, thus increasing the information bandwidth off the system.

In FIG. 8, the beam modifying device 80 could be a photo-elastic modulator that is capable of imparting temporally varying polarization action to the laser beam. This would allow one to utilize the effects of polarization-induced birefringence to interrogate a retroreflector with tailored birefringence properties, thus increasing the potential information bandwidth of the system.

In addition to the beam modifying device 80 having the ability to produce beams of tailored polarization and thus produce a tailored response from the retroreflector, the retroreflective tag 81 itself may be so constructed to induce a polarization rotation of the illuminating beam upon retroreflection. This may or may not include active devices at the target location. For example, micro-structured retroreflectors that employ corner reflection exhibit polarization selectivity, and may impart a polarization rotation to the illumination beam under certain circumstances. Thus, coupling polarization with variable focal length would produce a spatially dependent polarization response that would increase the information bandwidth of the system.

As discussed previously, the controller 23 in the photonic transceiver 20 performs the critical task of coordinating the operation of various system subcomponents such that they work in unison as a system. Coordinated operations include providing control signals to operate the laser, beam modifying device and scanning mirror device, and collecting electrical signals from the photo-detector.

Figure 9:
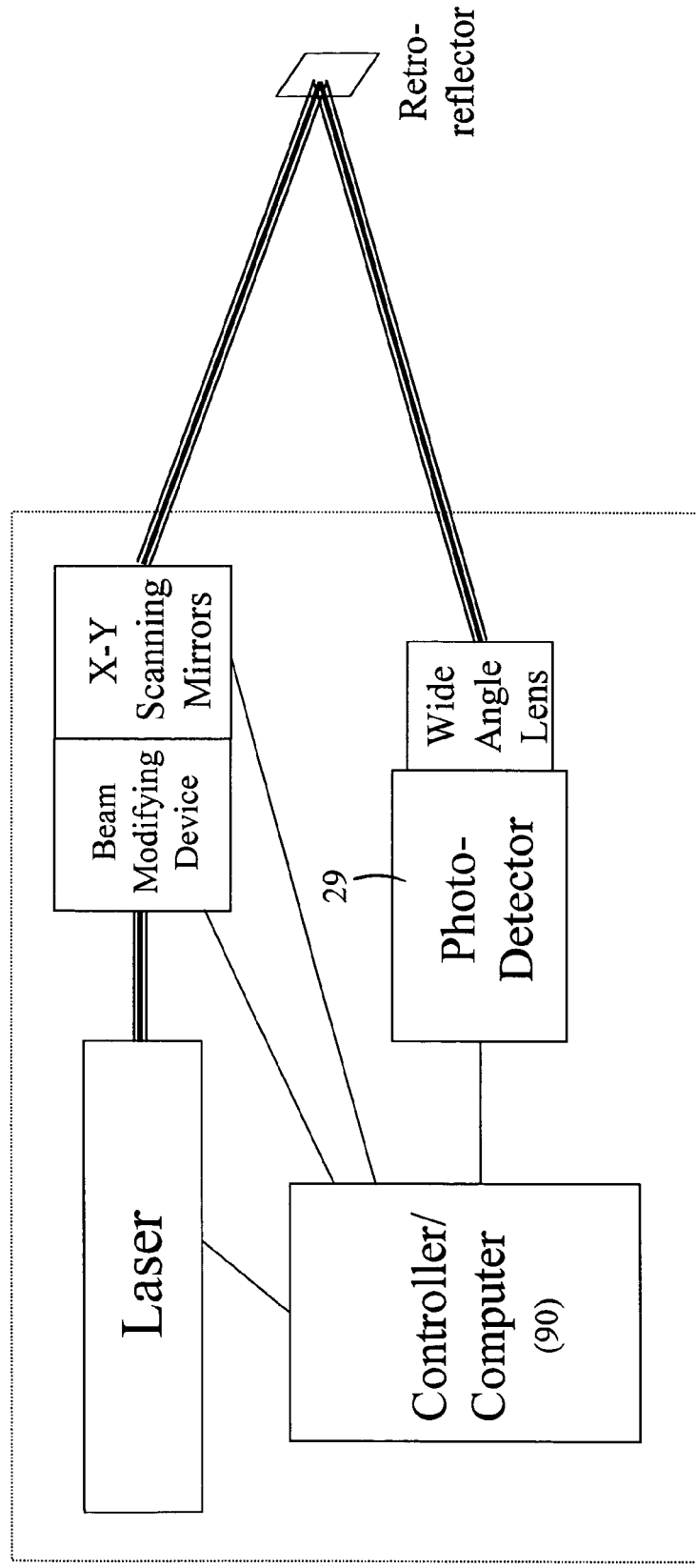
FIG. 9 illustrates the incorporation of a computer into the system of FIG. 4.

The controller illustrated in FIG. 9 is a controller/computer 90 that, upon collection of the electrical signal from the photo-detector 29, processes the electrical signal by performing filtering, amplification, mathematical transformations, etc., thus converting the processed electrical signal into data. Moreover, this acquired data is further processed by performing additional mathematical analyses to verify target presence, identity and/or displacement. The controller thus stores the processed data for future analysis and archives the data for long-term analyses, performance characterization, and item monitoring.

Figure 10:
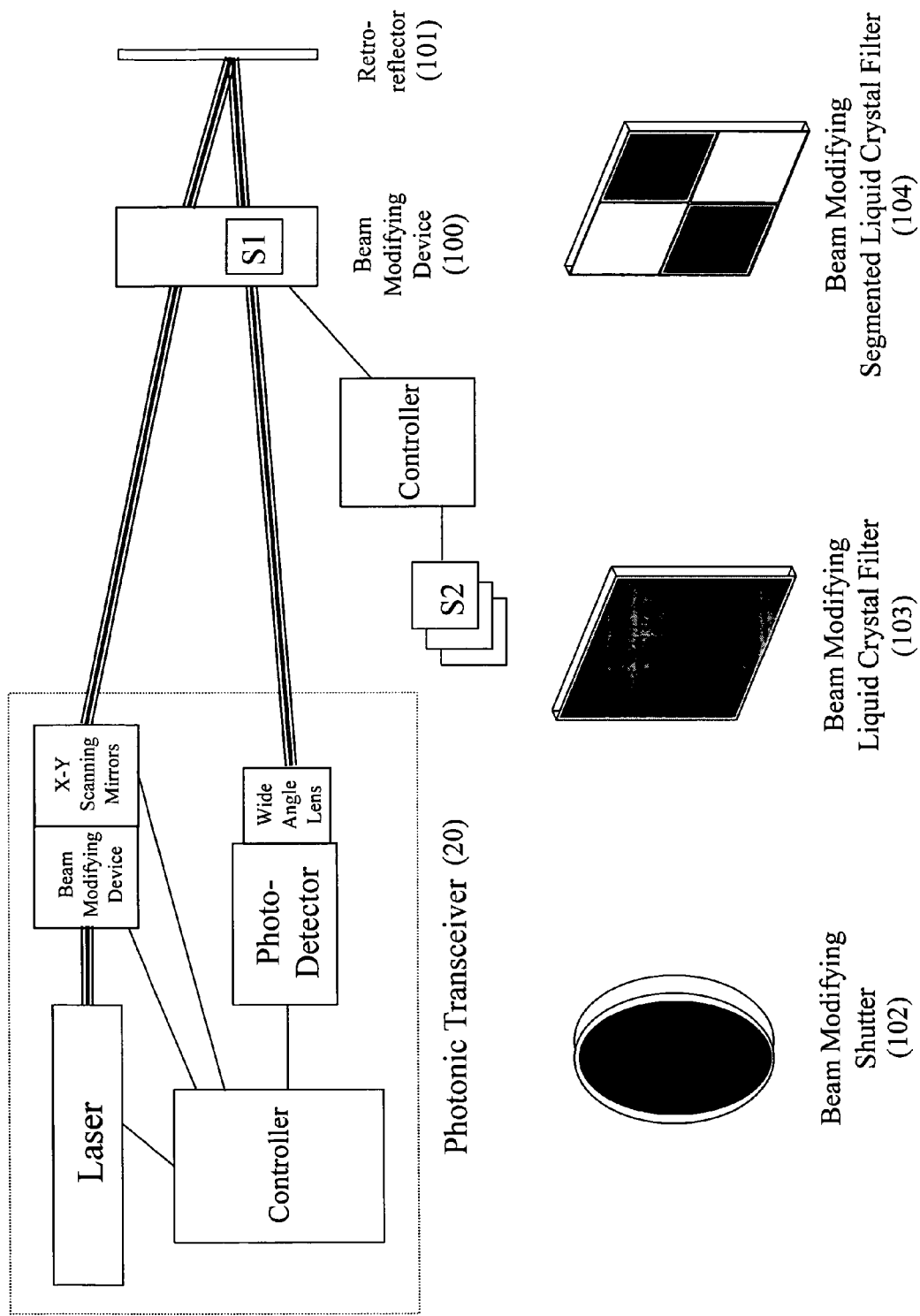
FIG. 10 illustrates the use of various beam modifying retroreflectors with the system of FIG. 4.

In FIG. 10, a means for modifying the properties of the retroreflected light beam in a controlled manner may also be included. A beam modifying device 100, co-located with a retroreflective target 101 and physically separate from the photonic transceiver 20, imparts controlled modifications to the reflected light beam. This beam modifying device works in cooperation with a sensor or sensors to initiate a controlled response to the transceiver 20. The controlled response includes beam modifications that are initiated via commands from the transceiver 20 (poll and respond link verification), through a sensor S1 incorporated in the beam modifying device, or via input from an external sensor(s) S2 that initiates a beam modification through the beam modifying device from an external stimulus.

The invention can further include retroreflectors that modify the properties of the retroreflected light in a spatially variable manner. Such retroreflectors, shown in FIG. 10, may include a beam modifying shutter 102, a beam modifying liquid crystal filter 103, a segmented liquid crystal filter 104 as its beam modifying device, or other means for controlling the reflectivity in a spatially varying manner. An additional means for spatially controlled retroreflection could include a digital light processing device such as a Texas Instruments DLP. This is a moving micro-mirror device with integrated diffuse retroreflective coating as the target itself.

Figure 11:
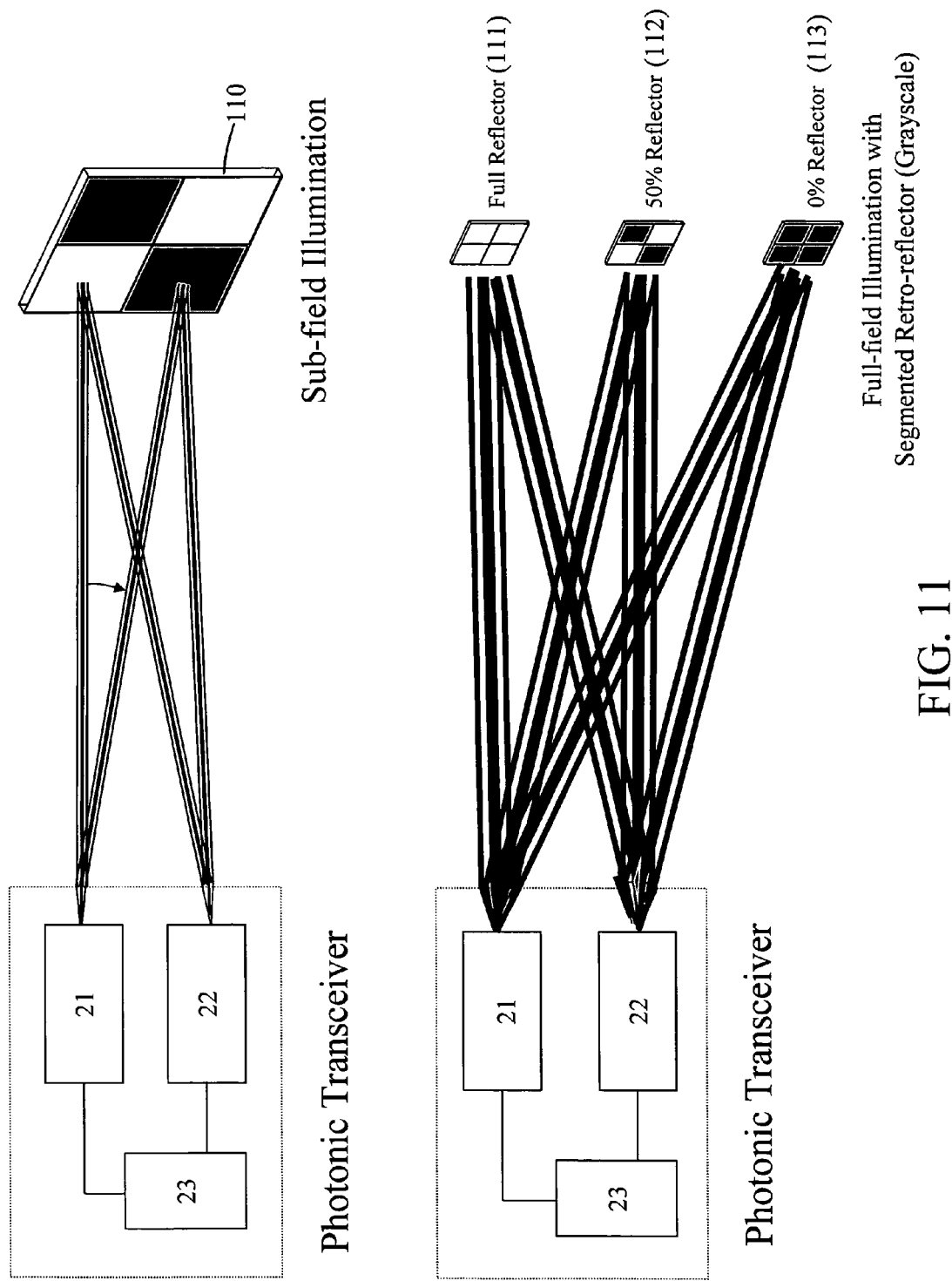
FIG. 11 illustrates the ability of the system of FIG. 10 to generate various modified retroreflected signals.

FIG. 11 illustrates the ability to generate various modified retroreflected signals through the coordinated use of an expanding or focusing beam modifying device at the transceiver. For example, by scanning a small diameter or focused beam over subregions of a retroreflector 110 with spatially varying reflectivity, one can produce an amplitude modulated returned signal. Alternatively, a grayscale intensity variation in the retroreflected signal can be produced through the coordinated use of an expanding or defocusing beam modifying device at the transceiver, and tailored reflectivity patterns from retroreflectors 111, 112, or 113, for example. A retroreflector with a large number of subregions (e.g. pixels) may be employed to generate a virtually continuously varying retroreflected intensity or grayscale.

Figure 12:
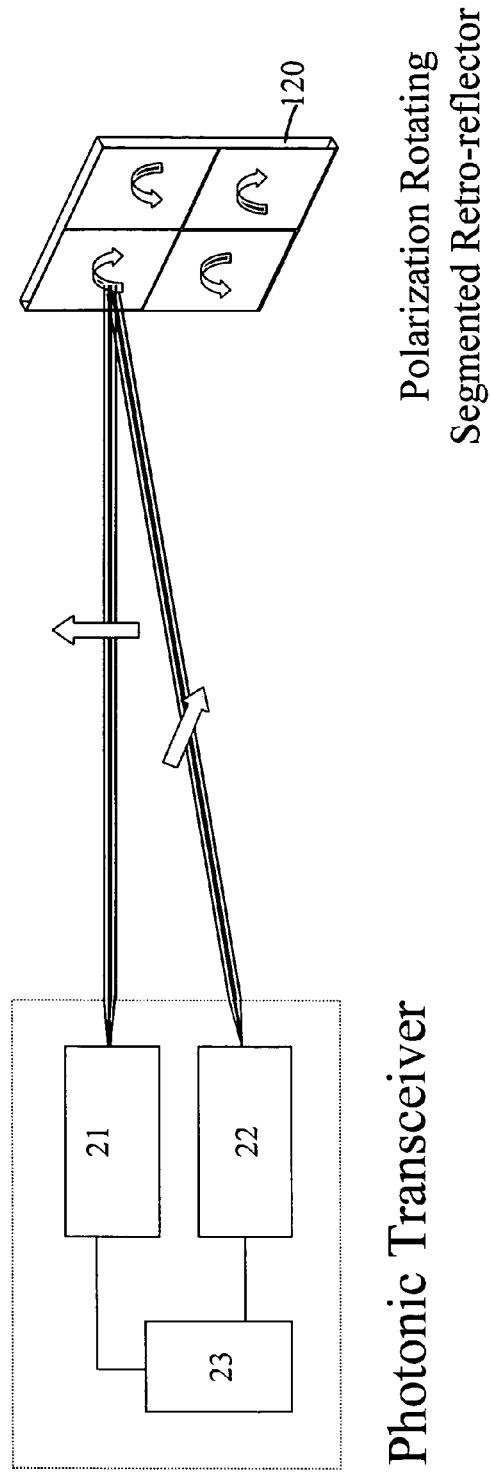
FIG. 12 illustrates the use of polarization-modifying retroreflectors with the system of FIG. 4.
Figure 12:
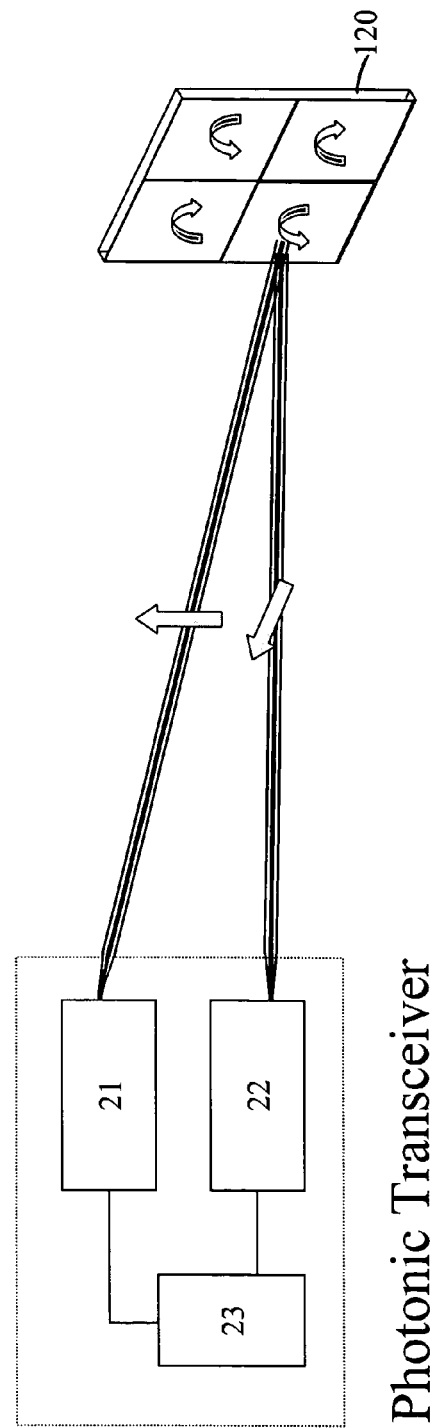

The invention can further include retroreflective targets with subregions of varying reflectivity that are polarization dependent as shown in FIG. 12. The target 120 could be constructed in a tailored manner such that an incident light beam of small diameter or focused only upon a particular subregion, and with specific polarization, would have its polarization state modified upon reflection. Furthermore, a target with tailored subregions could be constructed such that an incident light beam of specific polarization would only be reflected from certain regions. This latter case can result in an amplitude modulated returned signal upon scanning a small diameter or focused beam across subsequent subregions or effective grayscale level(s) for full field illumination with incident beams of various characteristics.

Figure 13:
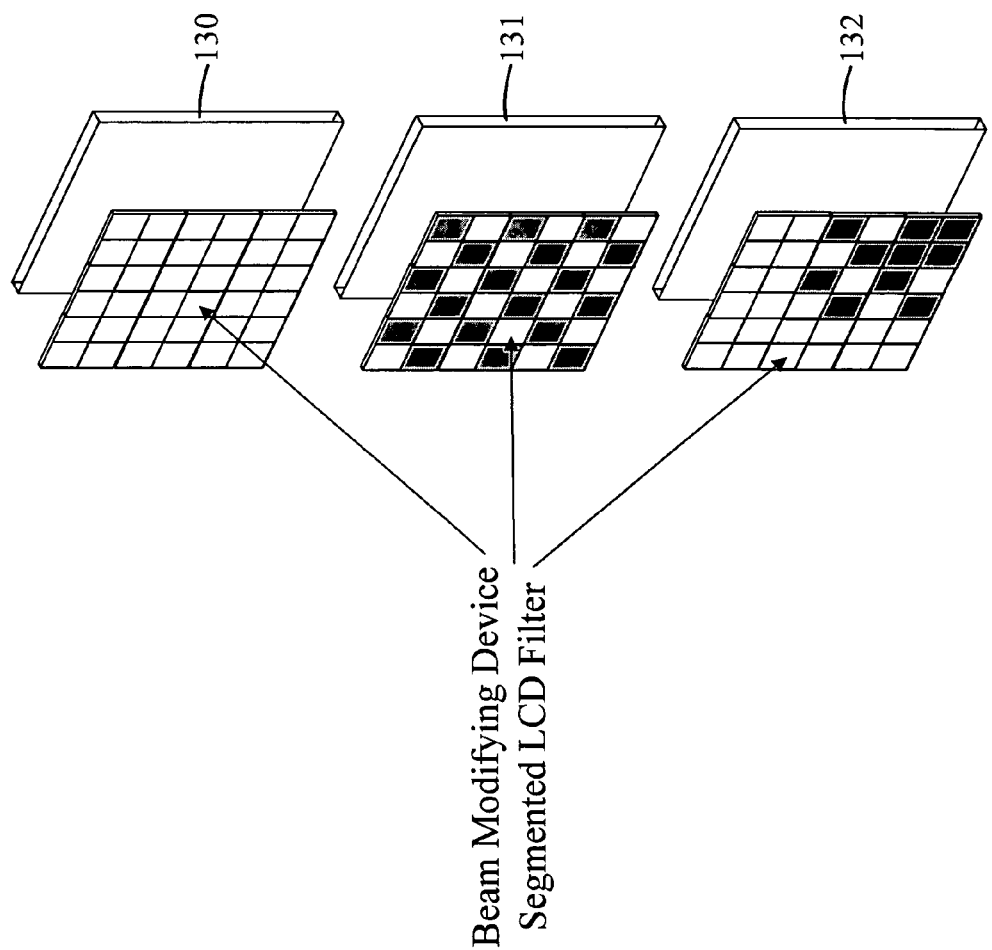
FIG. 13 illustrates the use of segmented retroreflectors having tailored properties with the system of FIG. 4.

In FIG. 13, segmented retroreflectors with tailored properties as a function of location can be utilized to produce intensity variation in the retroreflected beam. FIG. 13 illustrates a pixilated target with varying reflectivity properties pixel by pixel. Thus, depending upon the method of illumination such as small vs. large diameter beam or focused vs. defocused beam, one can produce an intensity modulation as a function of position while scanning, or an integrated intensity modulation during full-field illumination as a function of time through the different reflective properties, pixel by pixel.

The individually controllable pixels can display varying characteristics via several means including, liquid crystal filtering, polarization rotation, etc. Therefore, one or more beam modifying devices are necessary to achieve the cooperative behavior between the photonic transceiver and target necessary to exhibit intensity variation. This cooperative behavior that results in controlled modification of the beam properties significantly increases the information bandwidth of the system.

Figure 14:
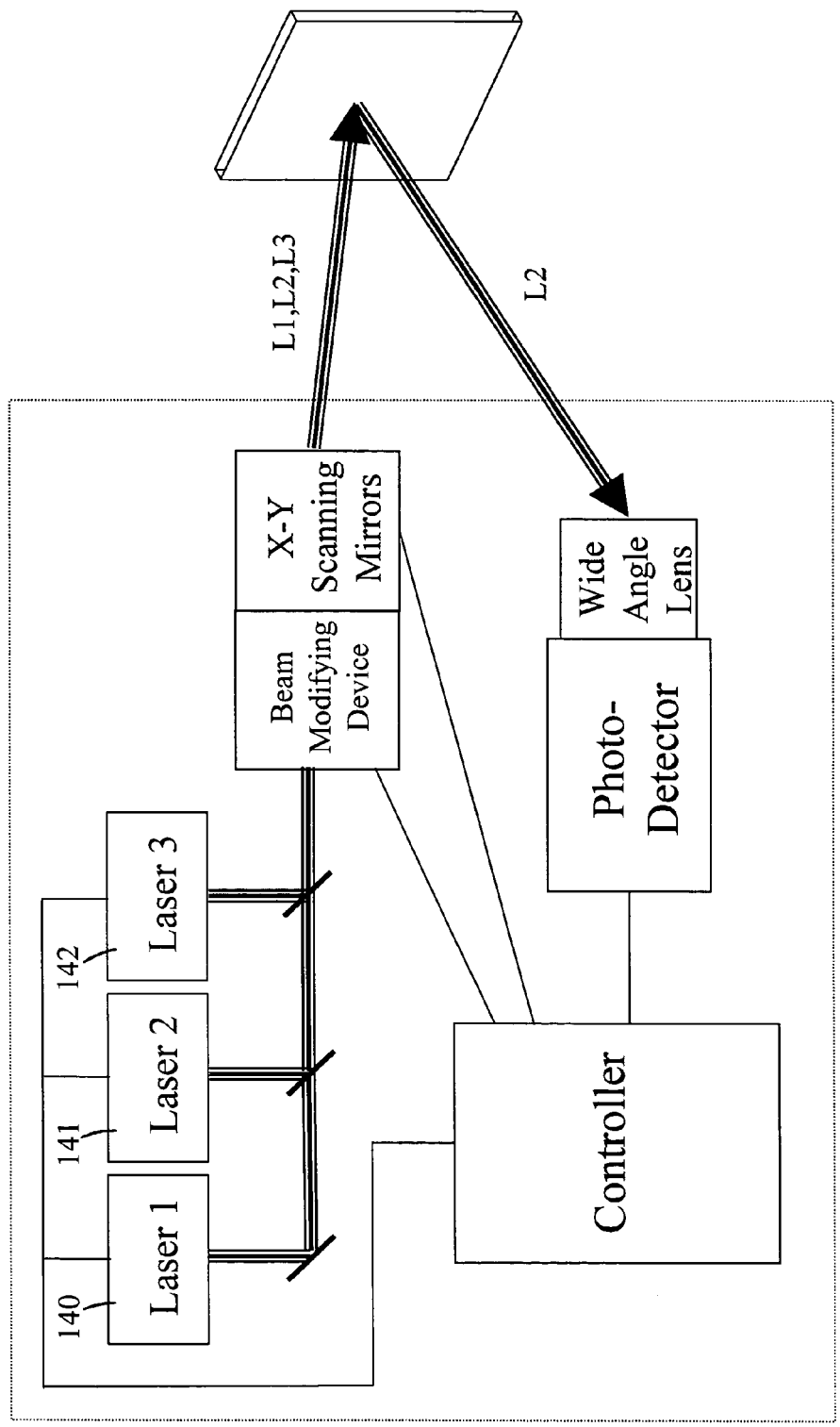
FIG. 14 is a block diagram illustrating the use of multiple laser beams with the system of FIG. 4.

In FIG. 14, the invention utilizes beams from multiple lasers 140, 141, 142. Multiple laser beams of differing wavelengths offers the advantage of increasing the information bandwidth of the system through wavelength dependent interrogation of a target with wavelength tailored properties. When a target is illuminated with, for example, a red laser beam (635 nm) it may be tailored to provide a retroreflected signal with certain characteristics. Upon illumination with, for example, a blue laser beam (425 nm), the target may produce a retroreflected signal of a different character, thus increasing the information bandwidth of the system relative to a single wavelength system. Many combinations and permutations utilizing amplitude modulation, polarization, and filtering or multiple effects simultaneously, result in a significant increase in information bandwidth for the system.

Figure 15:
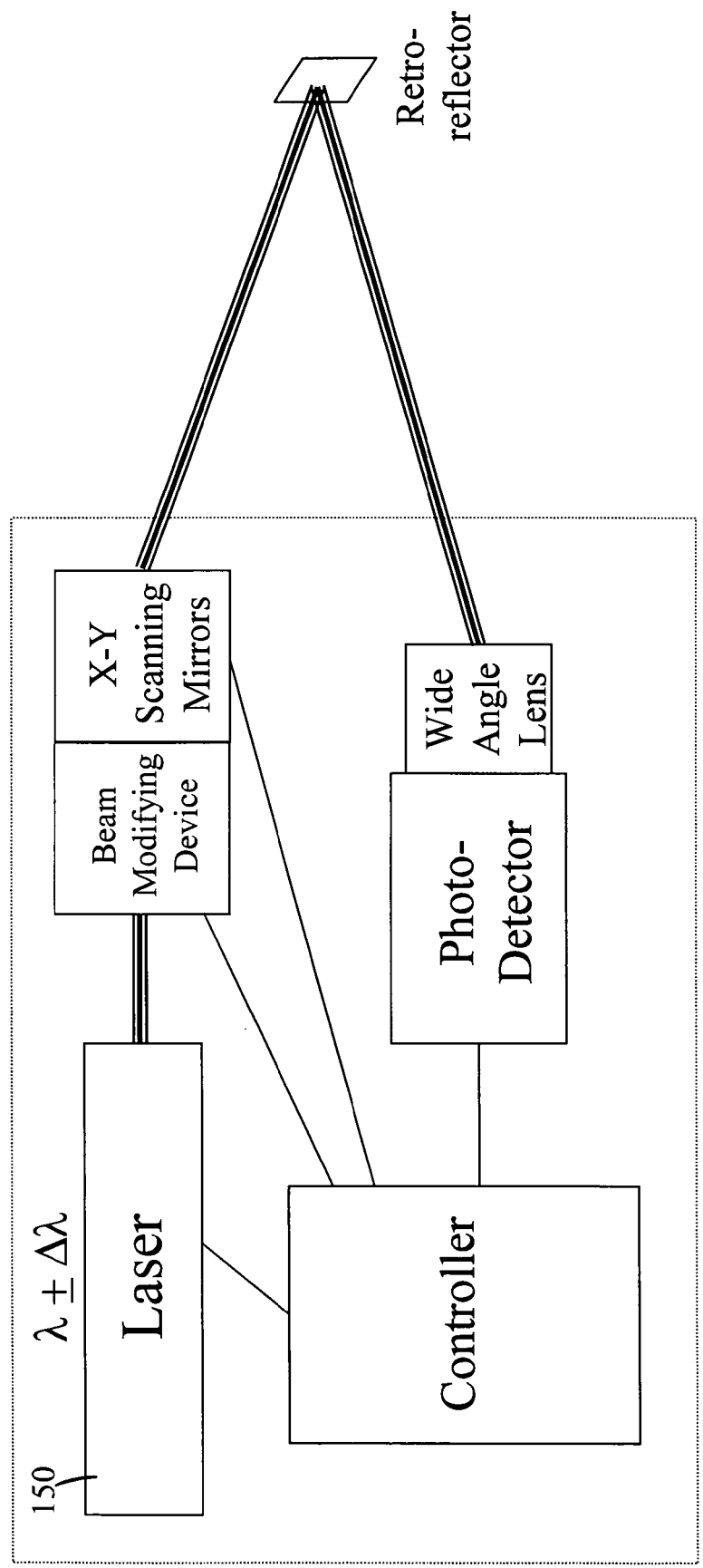
FIG. 15 illustrates the use of a wavelength tunable laser as the laser in the system of FIG. 4.

In FIG. 15, the invention can further employ a wavelength tunable laser 150. Tunable wavelength lasers further increase the information bandwidth of the system by interrogating retroreflectors with wavelength dependent features. For example, narrow bandpass filtering devices could be used in tandem with the retroreflector to produce patterns. These patterns might change as a function of wavelength and thus produce varying information content in the retroreflected beam as wavelength is varied.

Figure 16:
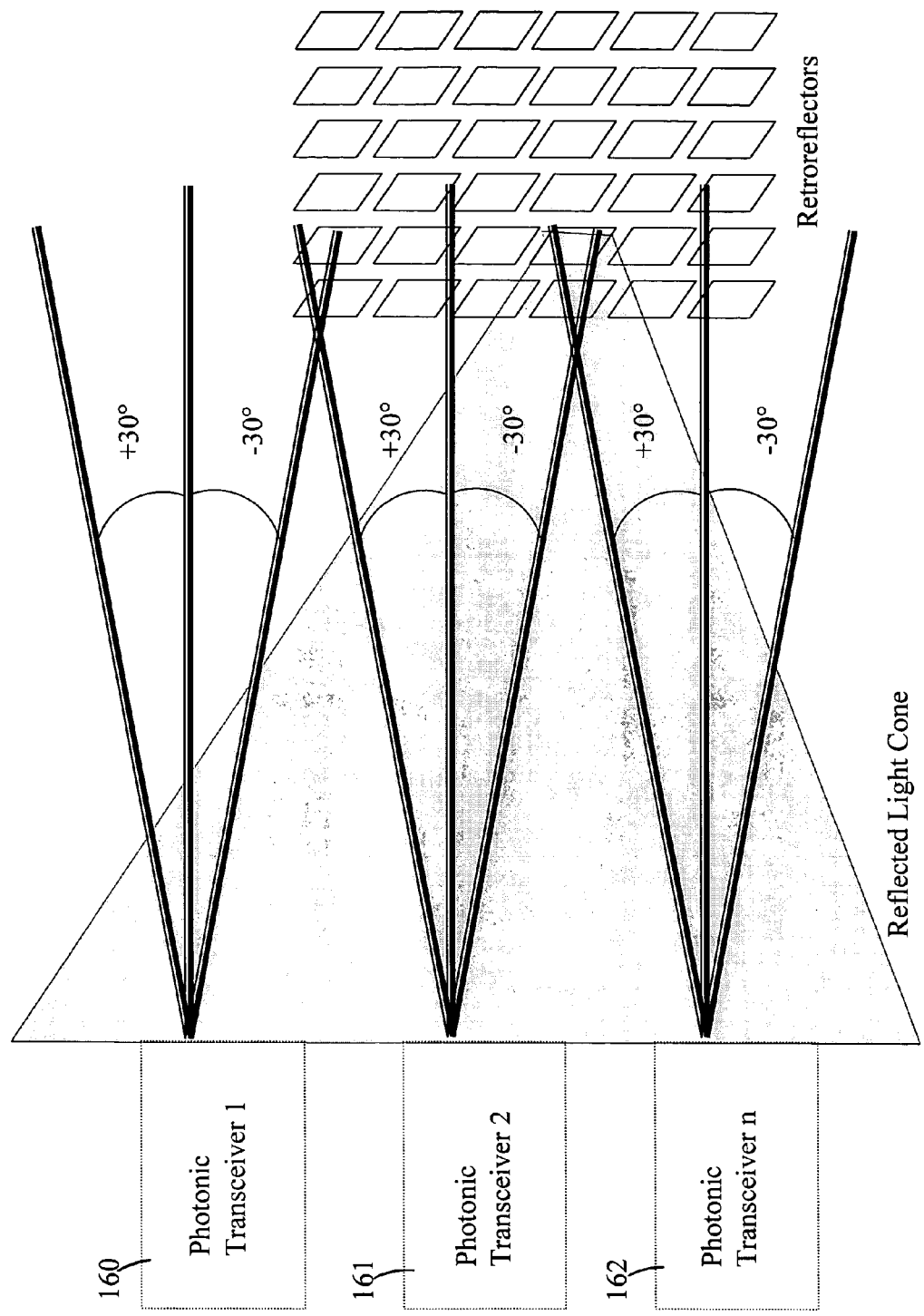
FIG. 16 is a diagram of a system that illustrates the interaction of multiple retroreflectors with multiple laser scanning transceiver systems.

As described above, the invention can utilize multiple laser beams simultaneously to produce correlated multiple retroreflections. Multiple lasers of differing wavelengths would be used to interrogate targets, accessing separate information at each wavelength. In FIG. 16, it will be appreciated that these multiple laser beams could emanate from separate and independent photonic transceivers 160, 161, 162 utilizing separate means for steering each independent beam. This would expand the system field of view and produce potentially correlated retroreflection information that enhances the system signal-to-noise ratio. In terms of target monitoring, interleaved multiple laser beams provide redundant monitoring, and thus increase the robustness of the monitoring system.

The invention as indicated by FIG. 16 may further include means for employing multiple and separate photonic receivers. Multiple receivers, separately located in space, could provide enhanced detection signal-to-noise characteristics through signal correlation methods and expand the system field of view. It also becomes feasible with multiple independently-located receivers to collect information that only lies within certain reflected regions. As described in Reference 6, retroreflectors have been designed with separate and distinct information about the monitored item present within separate reflected light cones. Thus, accessing the full compliment of information returned from a tailored retroreflector could require multiple photonic receivers located independently from each other.

It will be further appreciated that, as indicated by FIG. 16, the invention may further include means for utilizing multiple photonic transceivers simultaneously to maximize the information bandwidth of the system. Multiple transceivers offer the enhanced capability of increased field of view, correlated interleaved scanning, overlapping scanning, accessing separate information with each transceiver, use of multiple laser sources of differing characteristics, accessing angularly dependent information, viewing targets in motion, etc.

While there has been shown and described what are at present considered the preferred embodiments of the invention, it will be obvious to those skilled in the art that various changes and modifications can be prepared therein without departing from the scope of the inventions defined by the appended claims.

The invention claimed is:

1. An apparatus for determining the presence and displacement of a retroreflector attached to an object comprising:
    a laser;
    a steering means for angularly steering a light beam from said laser;
    a wide angle lens positioned within the cone of returned light from the retroreflector, wherein the intensity of light in the cone is greatest on the return laser beam axis, and diminishes at distances away from the axis, said lens offset from said steering means and offset from the return laser beam axis;
    a detector for receiving the returned light collected by said wide angle lens and converting said light into an electrical signal; and
    a controller for coordinating the operation of said light beam steering means and said detector, said controller also capable of relating the electrical signal generated by said detector to the position and characteristics of said angularly steering light beam.

2. The apparatus of claim 1 wherein said controller includes a computer for processing the electrical signal from said detector.

3. The apparatus of claim 1 wherein said means for angularly steering a light beam is an orthogonal pair of scanning mirrors.

4. The apparatus of claim 1 further including a means for modifying the light beam from said laser.

5. The apparatus of claim 4 wherein said means for modifying the light beam from said laser is a bean expander.

6. The apparatus of claim 4 wherein said means for modifying the light beam from said laser is a variable focal length telescope.

7. The apparatus of claim 4 wherein said means for modifying the light beam from said laser is a continuously varying neutral density filter.

8. The apparatus of claim 4 wherein said means for modifying the light beam from said laser is a micro-mirror array.

9. The apparatus of claim 8 wherein said means for polarizing the laser beam is a polarization filter.

10. The apparatus of claim 8 wherein said means for polarizing the laser beam is a retarder.

11. The apparatus of claim 10 wherein said means for modifying the polarization state of the polarized laser beam is a photo-elastic modulator.

12. The apparatus of claim 8 wherein said means for polarizing the laser beam is a photo-elastic modulator.

13. The apparatus of claim 8 further including a means for modifying the polarization state of the polarized laser beam.

14. The apparatus of claim 13 wherein said means for controlling the properties of the retroreflected polarized laser beam is a micro-structured retroreflector.

15. The apparatus of claim 8 further including a means for controlling the properties of the retroreflected polarized laser beam.

16. The apparatus of claim 4 wherein said means for modifying the light beam from said laser is a variable beam splitter.

17. The apparatus of claim 4 wherein said means for modifying the light beam from said laser is a means for polarizing the laser beam.

18. The apparatus of claim 1 wherein said laser is a plurality of laser producing a plurality of laser beams on a common axis.

19. The apparatus of claim 18 wherein said means for controlling the properties of the returned light from the retroreflector having dynamically controllable and spatially variable properties.

20. The apparatus of claim 18 wherein said means for controlling the properties of the returned light from the retroreflector is a shutter.

21. The apparatus of claim 18 wherein said means for controlling the properties of the returned light from the retroreflector is a liquid crystal filter.

22. The apparatus of claim 18 wherein said means for controlling the properties of the returned light from the retroreflector is a segmented liquid crystal filter.

23. The apparatus of claim 1 wherein said laser is a tunable wavelength laser.

24. The apparatus of claim 1 further including a means for controlling the properties of the returned light from the retroreflector.

25. The apparatus of claim 1 including at least one additional apparatus for determining the presence and displacement of a retroreflector, said apparatuses operated cooperatively.

26. The apparatus of claim 1 including at least one additional apparatus for determining the presence and displacement of a retroreflector, said apparatuses operated simultaneously and cooperatively.

* * * * *